US006931148B2

United States Patent
Mukai

(10) Patent No.: US 6,931,148 B2
(45) Date of Patent: Aug. 16, 2005

(54) PAPER DISCRIMINATOR

(75) Inventor: Masanori Mukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 764 days.

(21) Appl. No.: 09/771,694

(22) Filed: Jan. 30, 2001

(65) Prior Publication Data
US 2002/0039206 A1 Apr. 4, 2002

(30) Foreign Application Priority Data
Oct. 3, 2000 (JP) ........................................ 2000-303097

(51) Int. Cl.$^7$ .............................. G06K 9/00; G06F 7/04
(52) U.S. Cl. ........................................ 382/135; 194/206
(58) Field of Search .................................. 382/135, 137, 382/138, 305, 312; 194/206–213; 271/3.05

(56) References Cited

U.S. PATENT DOCUMENTS

| 5,437,357 A | * | 8/1995 | Ota et al. ................... 194/206 |
| 5,483,069 A | * | 1/1996 | Kofune et al. ........... 250/341.8 |
| 5,836,435 A | * | 11/1998 | Fujita et al. ................ 194/206 |
| 6,012,564 A | * | 1/2000 | Mukai ......................... 194/206 |
| 6,125,195 A | * | 9/2000 | Ohya et al. ................. 382/135 |
| 6,247,693 B1 | * | 6/2001 | Kawano .................... 271/3.05 |
| 6,394,256 B2 | * | 5/2002 | Mukai ......................... 194/207 |
| 6,681,036 B1 | * | 1/2004 | Iwai ........................... 382/135 |

FOREIGN PATENT DOCUMENTS

| JP | 59-68088 | 4/1984 |
| JP | 64-9590 | 1/1989 |
| JP | 06-753379 | 10/1994 |
| JP | 09-44721 | 2/1997 |

* cited by examiner

Primary Examiner—KanjiBhai Patel
(74) Attorney, Agent, or Firm—Staas & Halsey LLP

(57) ABSTRACT

In a paper discriminator having the line sensor and the point sensor, data to be obtained by the point sensor correspond to a common coordinate plane to data to be obtained by the line sensor. Thus, in partial data of the papers to be obtained by the point sensor also, a position for the entire surface of the papers of the part can be specified, and it is possible to compare data by the point sensor with reference data prepared in advance. Thus, discrimination precision of the papers is enhanced.

7 Claims, 4 Drawing Sheets

Image Data
(Before Normalized)

Image Data
(After Normalized)

Reference Image Data

Magnetic Data
(Before Normalized)

Magnetic Data
(After Normalized)

Reference Magnetic Data

(PRIOR ART)
FIG. 5A
FIG. 5B (PRIOR ART)
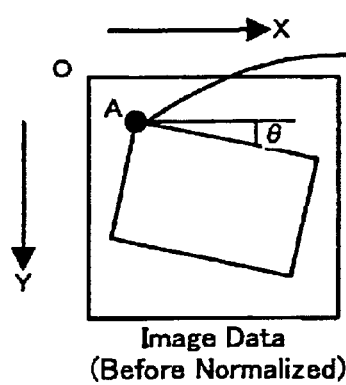
Image Data
(Before Normalized)
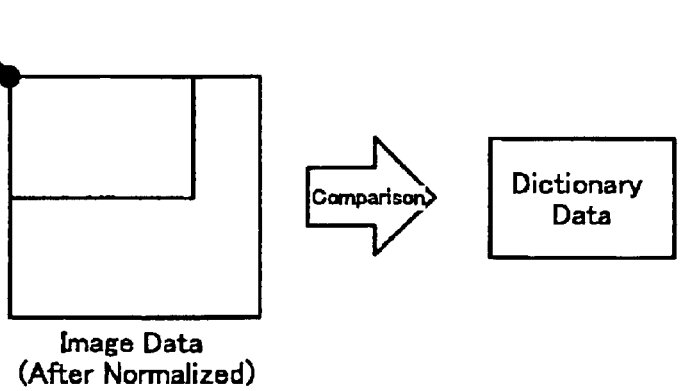
Image Data
(After Normalized)
Dictionary Data
(PRIOR ART)
FIG. 5C
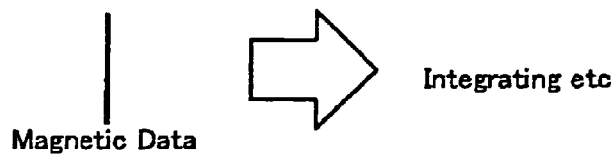
Magnetic Data
Integrating etc

PAPER DISCRIMINATOR

BACKGROUND OF THE INVENTION

1. Field of the Invention

The present invention relates generally to a paper discriminator for discriminating papers such as bills, and more particularly, to a paper discriminator provided with a line sensor detecting the entire surface of paper being conveyed and with a point sensor detecting a part thereof.

2. Description of the Related Arts

Paper handling apparatuses such as ATMs (Automatic Teller Machines) for processing, e.g., deposits and payments of bills incorporate a bill discriminator arranged to identify plural types of bills loaded or discriminate between the true and false of the bills loaded.

FIG. 4 is a diagram for explaining a placement of a line sensor and a point sensor in the bill discriminator. As shown in FIG. 4, the bill discriminator has the line sensor for taking images of the bills in a conveyance path, and the point sensor (for example, a magnetic head) for detecting a predetermined physical amount (for example, a magnetic amount) of the bills at a position away from the line sensor by a distance L. The line sensor is arranged in a direction (X direction) perpendicular to a conveyance path direction (Y direction) of the bills, and the bills pass the line sensor, so that the line sensor can take images of the entire bill. Furthermore, the bills pass the point sensor (for example, a magnetic head), so that the point sensor detects a physical amount (for example, a magnetic amount) of a part (1 line) of the bills.

Generically, a bill loading port of the bill processor has flexibility of about 20 mm with respect to a width of a bill, and a width of the conveyance path is wider than that of the bill. Accordingly, it is not limited that the bill is carried in parallel to the X, Y directions, and is occasionally carried obliquely to the line sensor.

FIGS. 5 are diagrams for explaining a conventional bill discrimination method. FIG. 5A is a typical view of image data of the bills carried in an inclined state on a XY coordinate plane. A data procession part of the bill discriminator detects an end point A of the bill and the inclined angle θ from the taken images by a predetermined data procession, and moves and rotates with the home position O as a reference, thereby executing the image data of the bill normalized as shown in FIG. 5B. The normalized image data move and correct a rotation, whereby the bill images approach a left corner, and are paralleled to the X, Y directions. The bill discriminator has in advance stored the image data (dictionary data) of intrinsic bills in a state that they are paralleled to the X, Y directions, and compares such dictionary data with the normalized image data, thereby judging a type and a truth or falsehood of the bills.

On the other hand, data obtained from the point sensor become a piece of linear data, as shown in FIG. 5C. For example, in the case where the point sensor is a magnetic head, the magnetic head detects magnetism included in an ink in a bill part passing it, thereby obtaining the magnetic data in a part of the bills. However, as described above, when the bills are carried in an offset manner, as it does not detect the entire bill unlike the line sensor, it cannot be judged which part of the bill the obtained magnetic data detect. Accordingly, as the detected magnetic data cannot be compared with the magnetic data of the intrinsic bill, in the prior art, a gross integration value of these magnetic data is acquired, etc. which is exploited for a truth or falsehood of the bill based on presence or absence of a magnetic amount, or the amount.

However, when it is possible to specify which part of the bill as data corresponds to the obtained magnetic data, it becomes possible to compare them with the magnetic data of the intrinsic bill, and to discriminate with higher precision.

On the other hand, a plurality of magnetic heads are arranged in an X direction, thereby configuring the line sensor, and the same correction processing as in the image processing in the above optical type line sensor is made, whereby it becomes possible to compare with the magnetic data of the entire intrinsic bill, and as causing an increase in costs, the configuration is not realistic.

SUMMARY OF THE INVENTION

It is therefore the object of the present invention to provide a paper discriminator which judges the position of paper corresponding to data to be detected by the point sensor and which achieves a higher precision discrimination.

In order to attain the above object, according to the present invention, in a paper discriminator having the line sensor and the point sensor, data to be obtained by the point sensor correspond to a common coordinate plane to data to be obtained by the line sensor. Thus, in partial data of the papers to be obtained by the point sensor also, a position for the entire surface of the papers of the part can be specified, and it is possible to compare data by the point sensor with reference data prepared in advance. Thus, discrimination precision of the papers is enhanced.

Preferably, according to the configuration of the paper discriminator of the present invention for attaining the above objects, there is provided a paper discriminator for discriminating papers being conveyed along a conveyance path, the paper discriminator comprising:

a line sensor arranged at a first position on the conveyance path, the line sensor acquiring first data on the entire surface of paper;

a point sensor arranged at a second position on the conveyance path, the point sensor acquiring second data on a part of the paper,;

a memory for storing the first data and the second data in correlation with a common coordinate plane;

a data processor for acquiring predetermined positional information of the first data on the coordinate plane and acquiring the position of the second data with respect to the position of the first data on the basis of the positional information;

a storage unit for storing first reference data of the entire surface of the paper corresponding to the first data and second reference data of the entire surface of the paper corresponding to the second data; and a discriminator for comparing the first data with the first reference data and comparing the second data with a part corresponding to the position of the second data in the second reference data, and for discriminating the paper based on the results of the comparison.

In the above configuration, more preferably, the paper discriminator further comprises a driver for controlling an operation start time of the line pointer or the point sensor on the basis of the difference of distance between the first position and the second position in the conveyance direction so as to allow the first data and the second data to be correlated on the common coordinate plane.

Preferably, the positional information includes an offset relative to the reference position on the coordinate plane and an inclination relative to the reference direction. The first reference data and the second reference data are data for the reference position and in the reference direction. The data processor may correct the first data and the second data into data for the reference position and in the reference direction on the coordinate plane based on the offset and the inclination.

For example, the line sensor may be an image sensor for taking image of the papers, and the point sensor may be a magnetic sensor for detecting the amount of a magnetism of the papers. In this case, the first data are image data, and the second data are magnetic data.

BRIEF DESCRIPTION OF THE DRAWINGS

FIG. 5 are diagrams for explaining a conventional papers discriminating method.

DESCRIPTION OF THE PREFERRED EMBODIMENTS

Presently preferred embodiments of the present invention will now be described. However, the technical scope of the present invention is not limited to this embodiment. According to the below embodiment, for description, the line sensor is an image sensor having a plurality of optical detection elements arranged like a CCD (charge-coupled device) as an example, and the point sensor is a magnetic sensor having at least one magnetic detection element for detecting the magnetic amount like a magnetic head as an example.

Figure 1:
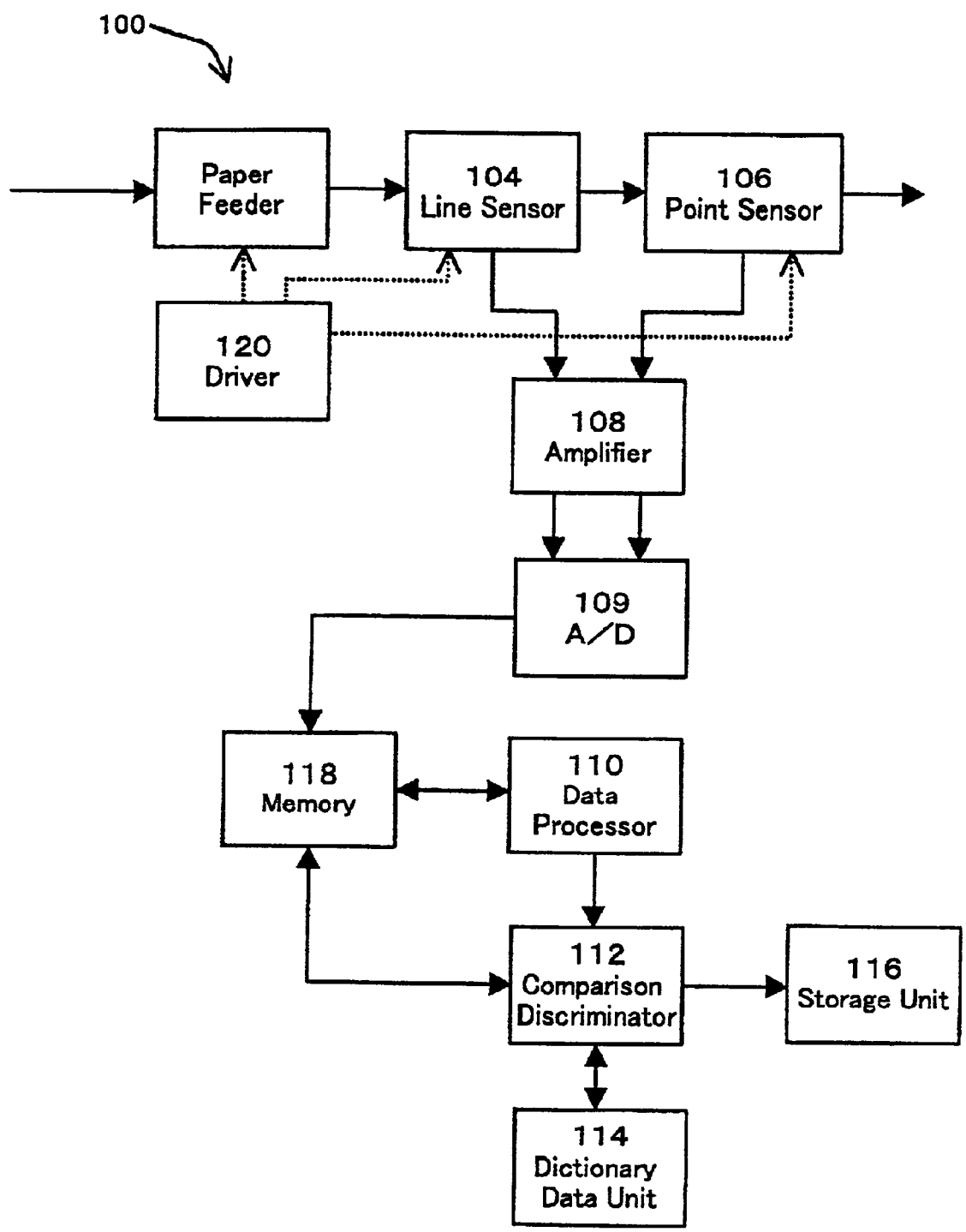
FIG. 1 is a block configuration diagram of a paper discriminator according to the embodiment of the present invention.

FIG. 1 is a block configuration diagram of a paper discriminator according to the embodiment of the present invention. In a paper discriminator 100 of FIG. 1, when the papers such as bills are loaded into a papers loading port, a papers feeder 102 feeds the papers one by one therefrom, and sends them to a conveyance path. In the conveyance path, a line sensor 104 and at least one point sensor 106 are arranged in parallel to the carrying direction (Y direction). The line sensor 104 takes the entire image of the papers moving in the conveyance path. Successively, at least one point sensor 106 is arranged away from the line sensor 104 by a distance L in a move direction of the conveyance path, and detects a magnetic amount of a part of the papers passing the point sensor 106. The line sensor 104 and the point sensor 106 operate according to control by a driver 120. Output data from each sensor are amplified by an amplifier 108, respectively, and digital data are converted by an A/D conversion part 109. Image data and magnetic data which are converted into the digital data are temporarily stored in a memory 118, and a data processor 110 performs various data processings such as an extraction, an end point correction, a coordinate transformation, a concentration correction, or the like as described below. Incidentally, the memory may be provided for each of the image data and the magnetic data, and may be common thereto for application according to this embodiment.

A comparison discriminator 112 compares reference data stored in a dictionary data unit 114 with image data and magnetic data which are data-processed, and judges a type or truth or falsehood of the papers, and the judgment results are stored in a storage unit 116. More specifically, the dictionary data unit 114 has in advance stored dictionary data containing reference image data on the entire surface of the papers of each type and reference magnetic data on the entire surface in parallel to the X, Y directions with respect to the intrinsic papers, respectively. Accordingly, the dictionary comparison discriminator 112 compares the image data of the papers which are taken images by the line sensor 104 with the reference image data of each type which are stored in the dictionary data unit 114, and further compares magnetic data of the papers detected by the point sensor with reference magnetic data of each type which are stored in the dictionary data unit 114, and the type or the truth or falsehood of the papers is judged based on the respective comparison results.

Figure 2:
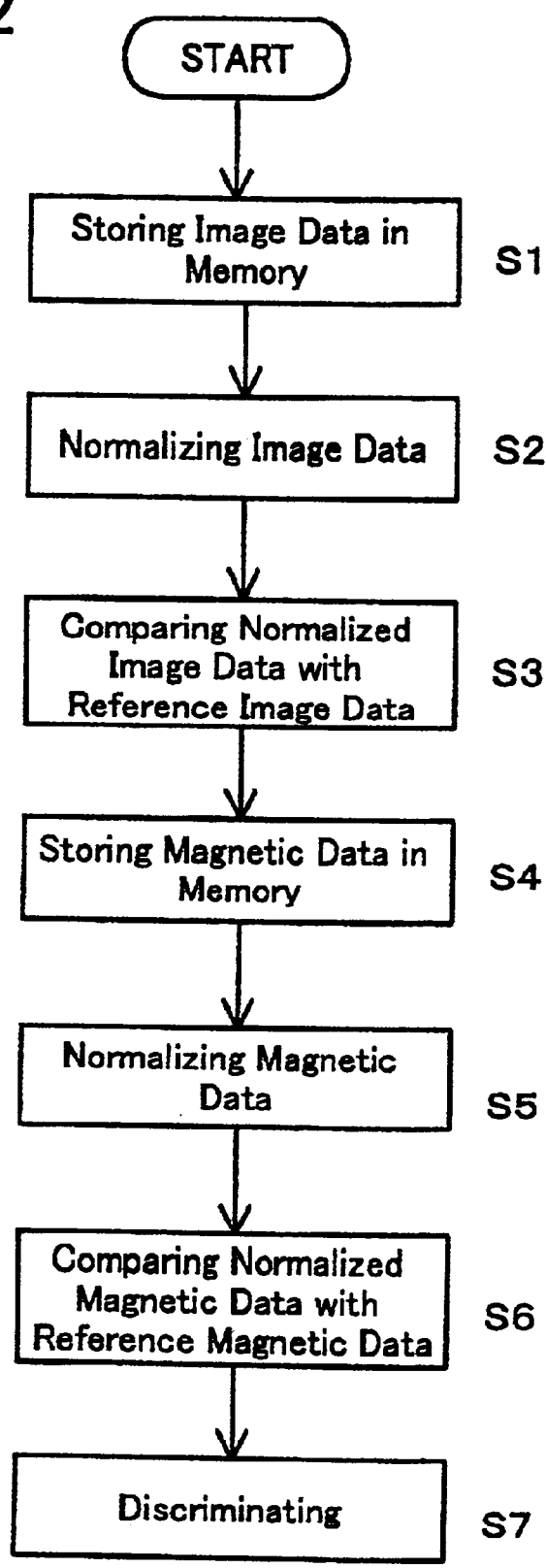
FIG. 2 is a data processing flowchart according to this embodiment.
Figure 3A:
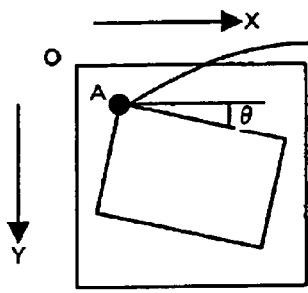
FIG. 3 are diagrams for explaining a data processing according to the embodiment of the present invention.
Figure 3B:
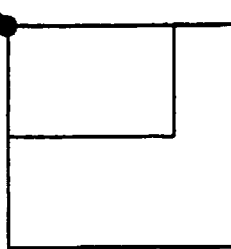
Figure 3B:
Figure 3C:
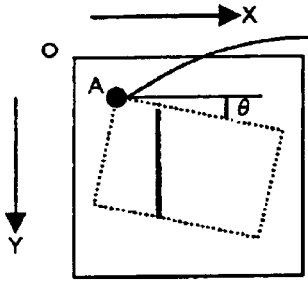
Figure 3D:
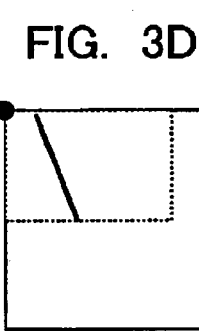
Figure 3D:
Figure 4:
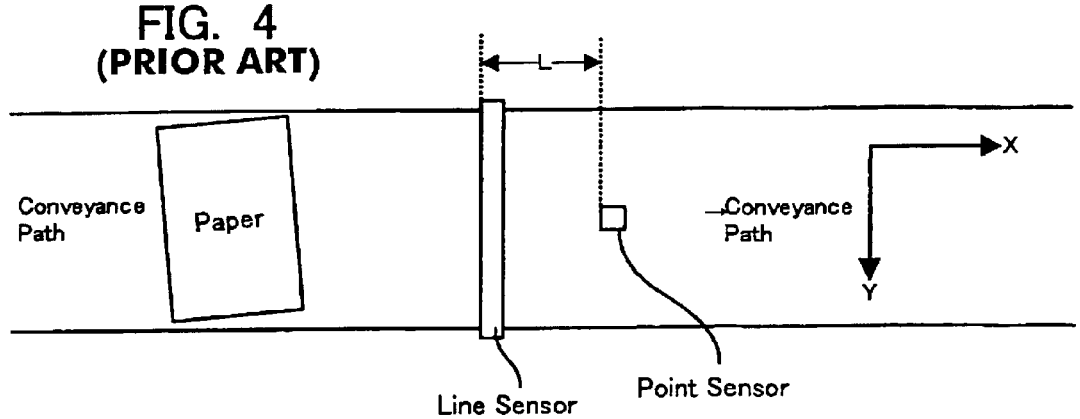
FIG. 4 is a diagram for explaining a placement of a line sensor and a point sensor in a paper discriminator.

FIG. 2 is a data processing flowchart according to this embodiment. FIG. 3 are diagrams for explaining a data processing according to the embodiment of the present invention. Referring to FIG. 3, FIG. 2 will be explained. FIG. 3A is a typical diagram of image data of the papers which are taken images by the line sensor 104. Furthermore, FIG. 3A shows the image data in the case where the papers are carried obliquely to the X, Y directions. The line sensor 104 is arranged in a direction (X direction) perpendicular to the conveyance direction, and takes images of the entire surface of the papers which are carried in the Y direction in each of predetermined sampling cycles, thereby generating a two-dimensional image data on an XY plane. The image data are stored in a memory 118 as two-dimensional data (S1 of FIG. 2). A width of the line sensor 104 is longer than a length in the X direction of the papers, and furthermore the line sensor starts to take image from before the papers pass the line sensor (for example, about 10 mm before doing), whereby the two-dimensional data including the image data on the entire surface of the papers are stored in the memory 118. The memory 118 stores the two-dimensional data as an optical detection element number included in the line sensor 104 about the X direction, and as dot data divided by the number of times of samplings about the Y direction.

A data processor 110 extracts image data (dotted line part) of a papers part from the two-dimensional data by the already-known processing, and detects coordinates of the end point A, and an inclined angle θ with respect to the X direction or the Y direction. The data processor 110 processes the two-dimensional data based on the inclined angle so as to rotate, and parallels the image data of the papers with respect to the X, Y directions. Further preferably, the data processor 110 processes the coordinates of the end point A so as to move them to a home position of the two-dimensional data (coordinate O at a left upper corner). In this manner, the image data of the papers are paralleled to the X, Y directions, and the end point A is processed so as to correct as a home position O of the two-dimensional data (normalization processing), so that the normalized image data of the papers can be obtained (refer to FIG. 3B) (S2 of FIG. 2).

The comparison discriminator 112 compares the normalized image data with the image data (reference image data) of each type of the papers stored in the dictionary data unit 114 (S3 of FIG. 2).

On the other hand, the point sensor 106 is arranged away from the line sensor 104 at the distance L in the carrying direction, and detects the partial magnetic amount of the papers passing therethrough. The magnetic data to be obtained by the point sensor 106 are a peace of linear data (one-dimensional data), but an X coordinate at a position where the point sensor 106 is arranged has been in advance established, and the sampling is performed at the same number of times as that of the line sensor 104, whereby the one-dimensional data can be stored in the memory 118 as the two-dimensional data on a common XY plane to data of the line sensor 104 (refer to FIG. 3C) (S4 of FIG. 2). Accordingly, a coordinate region of a bills part extracted by a data processing for the image data is applied to the XY plane of the memory 118 as it stands, so that the region (coordinate) of the papers part on the XY plane of the memory 118 can be extracted (part of a dotted line of FIG. 3C). Thus, it becomes possible to specify that the magnetic data correspond to which position of the papers part. At this time, when the magnetic data are stored in the memory 118, the image data may be left behind in the memory 118, or cleared. In either case, the data processing of the image data is completed, and in the case where left behind, the magnetic data are stored so as to overlap on the image data, and the data processing is carried out only for the magnetic data.

The data processor 110 performs the same correction processing as above for the magnetic data by use of the coordinates of the end point A and the inclination angle θ acquired in the data processing for the image data. Namely, the magnetic data are processed so as to rotate by the inclination angle θ, and further are processed so as to move so that the coordinates of the end point A come to the home position O (refer to FIG. 3D). Thus, the normalized magnetic data are obtained by the point sensor 106 (S5 of FIG. 2).

The comparison discriminator 112 compares the normalized magnetic data with the magnetic data (reference magnetic data) of each type of the papers stored in the dictionary data unit 114 (S6 of FIG. 2). At this time, as these normalized magnetic data are not the magnetic data of the entire papers, but the partial magnetic data, the comparison discriminator 112 reads out the reference magnetic data of a part corresponding to a position (coordinates) of the normalized magnetic data from the dictionary data unit 114 for comparison. The comparison discriminator 112 discriminates the type or the truth or falsehood of the papers based on the comparison of the image data and the comparison results of the magnetic data (S7 of FIG. 2).

In this manner, according to this embodiment, a comparison discrimination processing is also possible between output data from the point sensor and the dictionary data to enhance discrimination precision.

According to this embodiment, since the point sensor 106 is arranged rearward of the line sensor 104 by the distance L, times when the papers pass the line sensor 104 and the point sensor 106 differ. Accordingly, taking into consideration a difference in this distance, a sampling start time of the point sensor 106 is adjusted so that the home positions on the XY plane of the first memory and the second memory agree with each other. Specifically, the controller 120 calculates a offset time from a distance difference and a carrying speed, and the sampling operation of the point sensor 106 is started delaying in proportion to this offset time. Alternatively, in the case where the line sensor and the point sensor 106 concurrently start the sampling, taking into consideration the distance difference, the position of the XY plane of the first memory and the second memory may be corrected.

Furthermore, according to this embodiment, composed data of the image data and magnetic data composed in the memory 118 may be compared with the reference composed data in the dictionary data unit 114. In this case, the end point A and the inclination angle θ are acquired by the data processing for the image data.

The placement of the line sensor 104 and the point sensor 106 is not limited to the aforesaid embodiment, and the point sensor 106 may be arranged frontward of the line sensor 104. Furthermore, the line sensor 104 is the magnetic sensor, and the point sensor may be the image sensor. Furthermore, the point sensor 106 is not limited to the magnetic sensor or the image sensor, and for example, may be configured by a color difference sensor, a fluorescent sensor, a magnetic resistance element, or the like.

According to this embodiment, in the case where the data processor 110 for executing a characteristic processing and the comparison discriminator 112 are configured by a software, as it can be renewed by exchanging the software without changing a hardware (sensors, etc.) of the conventional paper discriminator, it is possible to readily apply the processing a according to the present invention to the shipped paper discriminator also.

Incidentally, according to this embodiment, the image data or magnetic data are normalized, but the image data and the magnetic data may not be normalized. Namely, the dictionary data unit 114 stores the reference data in each of the plurality of inclination angles θ, and selects the reference data in response to the acquired inclination angle θ, and compares the selected reference data with the image data and the magnetic data not normalized, so that the discrimination may be made.

Hereinabove, according to the present invention, in the paper discriminator having the line sensor and the point sensor, as even in the partial data of the papers to be obtained by the point sensor, a position for the entire surface of the partial papers can be specified, it becomes possible to compare the data with the reference data prepared previously, and to enhance discrimination precision of the papers.

The scope of protection of the present invention is not limited to the above embodiments but encompasses the invention defined in the appended claims and its equivalences.

What is claimed is:

1. A paper discriminator for discriminating a paper being conveyed along a conveyance path, the paper discriminator comprising:

a line sensor arranged at a first position on the conveyance path, the line sensor acquiring first data on an entire surface of the paper;

a point sensor arranged at a second position on the conveyance path, the point sensor acquiring second data on a part of the paper;

a memory for storing the first data and the second data in correlation with a common coordinate plane;

a data processor for acquiring positional information of the first data on the coordinate plane and acquiring a position of the second data with respect to a position of the first data based on the positional information by correlating the first data and the second data with the common coordinate plane;

a storage unit for storing first reference data of the entire surface of the paper corresponding to the first data and second reference data of the entire surface of the paper corresponding to the second data; and a discriminator for comparing the first data with the first reference data and comparing the second data with a part corresponding to the position of the second data in the second reference data, and for discriminating the paper based on the comparing.

2. The paper discriminator according to claim 1, further comprising:

a driver for controlling an operation start time of the line sensor or the point sensor based on a difference of distance between the first position and the second position in a direction of the paper on the conveyance path so as to allow the first data and the second data to be correlated on the common coordinate plane.

3. The paper discriminator according to claim 1, wherein the positional information includes an offset relative to a reference position on the common coordinate plane and an inclination relative to a reference direction.

4. The paper discriminator according to claim 3, wherein the first reference data and the second reference data are data for the reference position and in the reference direction, and the data processor corrects the first data and the second data into data for the reference position and in the reference direction on the common coordinate plane based on the offset and the inclination.

5. The paper discriminator according to claim 1, wherein the line sensor is an image sensor for taking images of the paper, and the point sensor is a magnetic sensor for detecting an amount of a magnetism of the paper.

6. A paper discriminator to discriminate a paper being conveyed along a conveyance path, the paper discriminator comprising:

a first sensor to acquire first data related to an entire surface of the paper;

a second sensor to acquire second data related to a portion of the paper;

a memory to store the first data and the second data in correlation with a common coordinate plane; and a data processor for acquiring a position of the first data on the coordinate plane and acquiring a position of the second data with respect to the position of the first data by correlating the first data and the second data with the common coordinate plane.

7. A method of discriminating a paper being conveyed along a conveyance path, the method comprising:

acquiring first data related to an entire surface of the paper;

acquiring second data related to a the paper;

storing the first data and the second data in correlation with a common coordinate plane; and acquiring a position of the first data on the coordinate plane and acquiring a position of the second data with respect to the position of the first data comprising correlating the first data and the second data with the common coordinate plane.

* * * * *

UNITED STATES PATENT AND TRADEMARK OFFICE
CERTIFICATE OF CORRECTION

| | | |
|---|---|---|
| PATENT NO. | : 6,931,148 B2 | Page 1 of 1 |
| APPLICATION NO. | : 09/771694 | |
| DATED | : August 16, 2005 | |
| INVENTOR(S) | : Masanori Mukai | |

It is certified that error appears in the above-identified patent and that said Letters Patent is hereby corrected as shown below:

On Title Page, Item (56) Col. 2
FOREIGN PATENT DOCUMENTS, change "06-753379" to -- 06-75379 --

Column 8, line 17, after "a" insert -- portion of --

Signed and Sealed this

Eighteenth Day of July, 2006

JON W. DUDAS
*Director of the United States Patent and Trademark Office*